United States Patent
Garland et al.

(10) Patent No.: US 6,212,270 B1
(45) Date of Patent: Apr. 3, 2001

(54) CONTROL OF TELEMETRY INTERFACE GATEWAY FOR A VOICE CALL

(75) Inventors: Stuart Mandel Garland, Morton Grove; David B. Smith, Hinsdale, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/994,245

(22) Filed: Dec. 19, 1997

(51) Int. Cl.[7] .......................... H04M 3/523; H04M 11/00
(52) U.S. Cl. ....................... 379/265; 379/106.01
(58) Field of Search .................. 379/106.01, 106.03, 379/201, 265, 266, 106.09, 188, 309

(56) References Cited

U.S. PATENT DOCUMENTS

| | | | |
|---|---|---|---|
| 5,327,488 | * 7/1994 | Garland | 379/201 |
| 5,359,641 | * 10/1994 | Schull et al. | 379/106 |
| 5,369,691 | 11/1994 | Cain et al. | 379/106 |
| 5,394,461 | * 2/1995 | Garland | 379/106 |
| 5,452,343 | * 9/1995 | Garland et al. | 379/106 |
| 5,535,267 | * 7/1996 | Schull | 379/106.03 |

FOREIGN PATENT DOCUMENTS

| | | | |
|---|---|---|---|
| 2166625 | 5/1986 | (GB) | H04M/11/06 |
| 9212590 | 7/1992 | (WO) | H04M/11/00 |

* cited by examiner

Primary Examiner—Harry S. Hong
(74) Attorney, Agent, or Firm—Werner Ulrich

(57) ABSTRACT

Relates to apparatus and methods for permitting an agent of a utility or service bureau to access customer metering equipment before or during a conversation with the customer. For accessing before a call, while the customer is still on-book, an alert signal is sent to activate the telemetering equipment prior to establishing a voice connection. For accessing during the call, an alert signal is sent while the customer is off-hook. Advantageously, the measurement can be made in conjunction with the oral contact with the customer, thus making customer contacts more efficient and providing better service to customers.

11 Claims, 3 Drawing Sheets

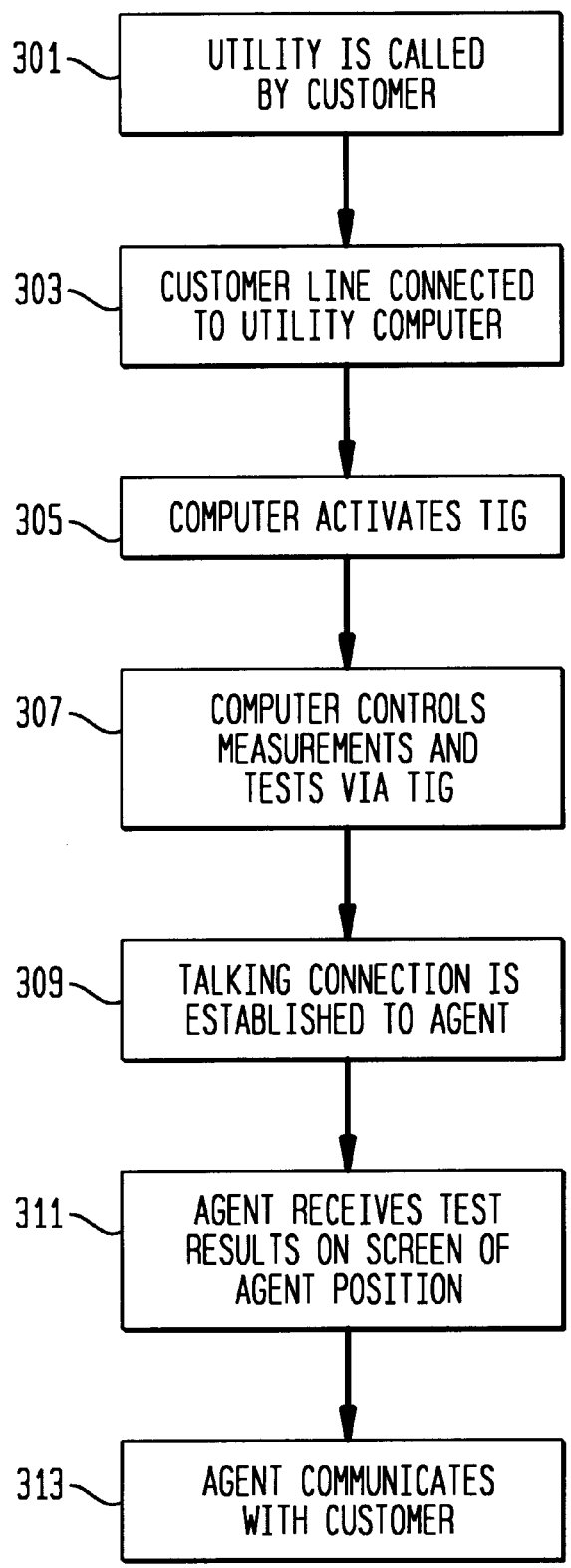

CONTROL OF TELEMETRY INTERFACE GATEWAY FOR A VOICE CALL

TECHNICAL FIELD

This invention relates to arrangements for customer access to a Telemetry Interface Gateway to read and send data during call set-up and call tear-down.

PROBLEM

Standard arrangements now exist for allowing a utility to access metering equipment or to control units such as air conditioning units over the telephone connection to a customer. The present arrangements have the disadvantage that they can only be used when the line is not busy, i.e., is not engaged in a communication unless expensive integrated data/voice modems are installed at both ends of the connection, or undesirably, when "barge-in" is invoked. Frequently, however, when a customer calls a utility, the customer's problems can be resolved by accessing the customer's metering equipment from the utility. For example, if the customer complains that his bill was much too high the previous month, the utility can access the electric meter to determine its present reading and thereby check to see if the bill was based on an erroneous reading. In other applications, a service bureau can perform diagnostic tests on customer appliances or download stored maintenance data. The problem of the prior art is that there are no low cost arrangements for allowing the utility or service bureau to access the customer's telemetering equipment without requiring the customer to first hang up and then be re-called after the automated reading has been executed, or to send someone to the customer's location to manually read the meter. In view of the high cost of handling customer communications, the inability to solve the problem immediately by accessing the metering equipment while a customer is still connected to a service representative is costly and is not really acceptable customer service. (For clarity, the term "utility" as used hereinafter includes a service bureau).

SOLUTION

The above problem is solved and an advance is made over the prior art in accordance with this invention, wherein in response to receiving a call for a particular directory number an alert signal is sent to activate a telemetering interface unit at the customer's premises, prior to establishing a voice connection to an agent and while the line is already in the off-hook state. Advantageously, this then permits the meter equipment at the customer's premises to be accessed prior to connecting an agent so that the agent can have access to up-to-date information while talking to the customer. Specific called directory numbers can be programmed for dedicated communication to either meters or control devices. In accordance with one preferred embodiment, a security dialogue takes place between the utility equipment and the telemetering interface to ensure that the utility is accessing correct customer premises equipment and that the customer has the correct equipment. The switch can provide a security function and filter returned data to assure that only authorized information is sent to the utility. This dialogue can be in accordance with the prior art. The computer which records the information obtained from the customer premises equipment causes the information to be displayed at the agent's position. If necessary and in order to take additional measurements or perform additional control actions, the agent causes another alert signal to be sent to activate the telemetering interface unit. In order to access the customer's premises equipment while the customer is still in the off-hook state and further dialogue between the customer and the agent can then take place. In accordance with one preferred embodiment, the incoming call is recognized at an automatic call distributor for the agents and the automatic call distributor causes the initial set of measurements to be performed; optionally, an announcement such as "We are testing your equipment" can be returned, or a specific identifying tone that is associated with "test in progress". In an alternative arrangement, a switch of the public switched telephone network recognizes the telephone number, and causes the measurement connection to be established; an announcement would serve to warn the customer about the unusually long set-up time on the connection. A third alternative is to have customer premises equipment for recognizing the telephone number and automatically initiating the measurement connection through signals to the automatic call distributor.

Advantageously, using this arrangement a utility agent can talk to a customer about a problem with prior knowledge of the measurements most likely to be important for solving the problem and if necessary can obtain additional measurements all within a single call, reducing the likelihood of having to call the customer back.

BRIEF DESCRIPTION OF THE DRAWING

FIGS. 2 and 3 are flow diagrams for alternative methods of utilizing applicants' apparatus.

DETAILED DESCRIPTION

Figure 1:
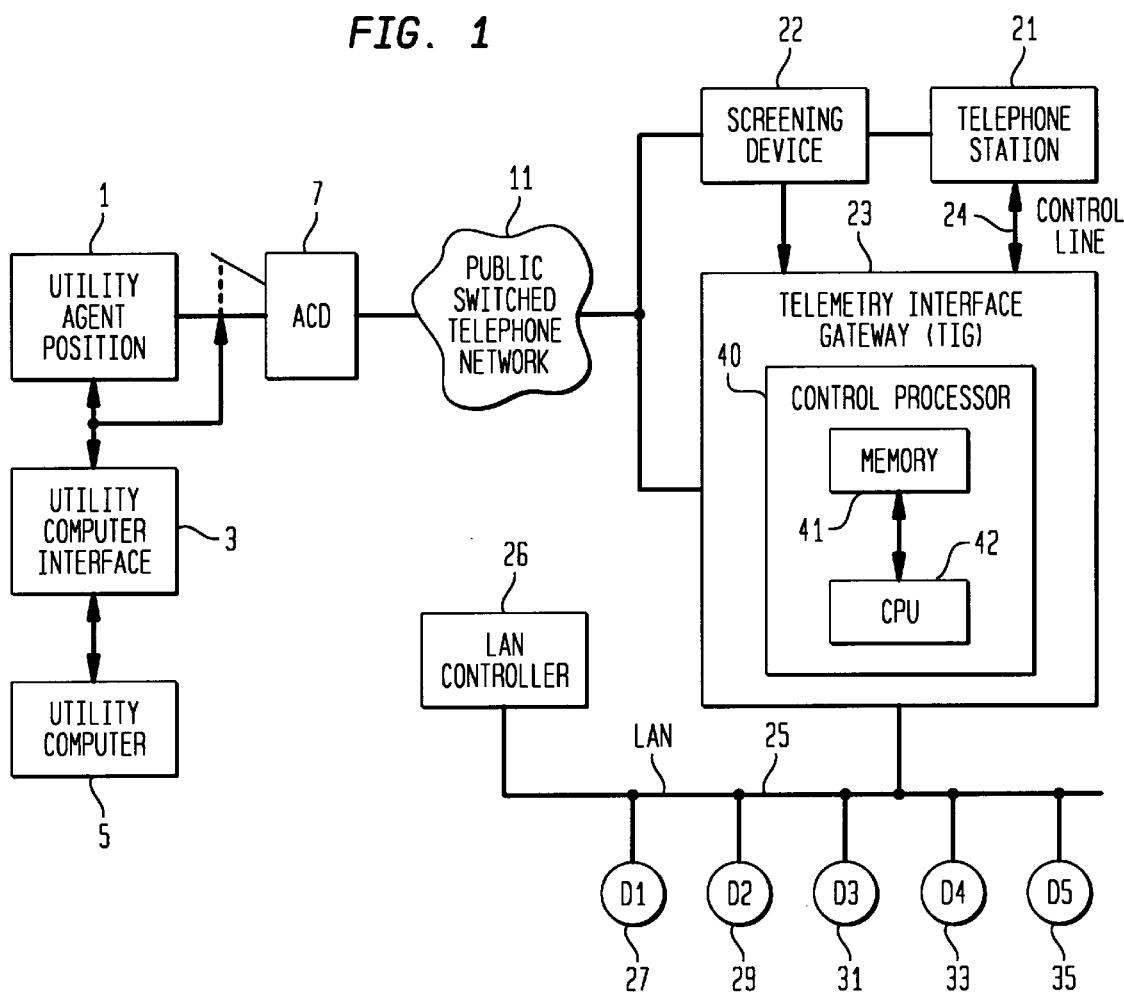
FIG. 1 is a block diagram illustrating applicants' invention.

FIG. 1 is a block diagram illustrating the operation of applicants' invention. A group of utility agent positions are connected to the public switched telephone network 11 through an automatic call distributor 7. A utility agent staffs a utility agent position 1 which contains a telephone and a keyboard for data entry and a monitor for the display of data. The utility agent position is connected to a utility computer interface 3 which allows a plurality of utility agent positions to interface with a single utility computer 5. The utility computer interface sends data to and receives data from the utility agent position and passes such data from or to the utility computer. In addition, the utility computer interface receives instructions from the utility computer to transmit alert signals and telemetering control signals to the called customer device. The utility agent position 1 is connected via the public switched telephone network to the telephone station 21 of a customer. If the customer originates the call, a screening device 22 can detect whether the call is to a utility or service bureau, and if so, notify the TIG to initiate actions leading to initial tests prior to establishing a voice connection to an agent. (See FIG. 3). When, as a result of the conversation, the utility agent decides that tests should be applied or meters read, the utility agent causes a request to the utility computer to be generated and the utility computer causes an alerting signal to be sent out by the utility computer interface 3, which should, preferably, cause the customer's telephone talk/receive path to be muted. In this case, since the called station 21 is off-hook, the telemetry interface unit recognizes the alerting signal while the line to the telephone station is in the off-hook state. The telemetry interface unit 23 receives the alerting signal and responds to the alerting signal by participating in a security dialogue as required. This security dialogue is essentially the same security dialogue that is used for the normal on-hook Telemetry Interface Gateway (TIG) Unit connection, in that the utility verifies whom it is talking with, that the customer has the correct equipment, and the TIG verifies the authority of the utility. Note that all TIGs are initially on-hook, receiving the alert tone and subaddress. As a result of receiving the alert tone and subaddress, the TIG may become either an on-hook transmitting device or an off-hook transmitting device. The utility informs the switch of the off-hook or on-book state, since the switch responds differently to the two types of devices. In an alternative arrangement, the TIG becomes active after the security dialog. After the security dialogue has been successfully completed, the utility computer responds to requests keyed in by the utility agent at the utility agent position by causing the utility computer interface 3 to generate the control signals required to perform the tests and read the meters that the utility agent has requested; the agent can specify a pre-programmed set of tests or specific tests. The Telemetry Interface Gateway (TIG) unit receives these control signals and responds to them by querying the meters and performing the appropriate tests. The Telemetry Interface Gateway (TIG) unit then transmits back to the utility computer interface 3, the signals representing the results of the meter readings and tests. These signals are interpreted by the utility computer 5 which generates data for display at the utility agent position and records the data in the utility computer for rebilling and other future purposes. The computer can suggest alternative actions to the agent. The utility agent position can generate additional requests for meter readings and data based on the results of the earlier tests and meter readings. When the utility agent is satisfied with the results of the tests or feels that no further tests are likely to be useful, the utility agent requests a disconnection of the Telemetry Interface Gateway (TIG) unit and a reconnection of the voice connection to the telephone station 21, and the light goes out. The utility agent can then discuss the results of these tests with the customer at telephone station 21. Alternatively, the utility computer causes a signal to be sent to the Telemetry Interface Gateway (TIG) unit to disconnect the Telemetry Interface Gateway (TIG) unit connection and to re-establish the full connection (without muting) of the telephone customer's station. In both cases, the TIG sends a signal back to the utility indicating its idle state, or simply removes the carrier signal. In contrast to a normal TIG connection, the TIG does not send a full connection disconnect back to the switch after the read/test cycle has been completed; instead a voice connection remains and, if previously muted, is restored to normal.

During the time that the Telemetry Interface Gateway (TIG) unit is in the active state, the telephone station can be partially or completely muted via control line 24 or special muting tone from the utility so that the customer does not hear loud data signals and does not generate speech signals which might interfere with the data signals. Control line 24 can either send tone to station 21 or activate an electrical circuit. If tone is sent from the utility or the TIG, a regular line can be used. Complete muting can be accomplished by simply disconnecting the handset; partial muting (which has the advantage of letting the customer hear tones indicating that something is going on) can be accomplished by shunting the microphone and earphone of the handset, or by inserting impedance in series with these devices. Alternatively, the customer can simply be warned about the presence of signals on the line and be asked to refrain from speaking until the agent speaks. A lamp at the customer's station can indicate that the TIG is communicating with the utility. The latter arrangement has the advantage of being supported by existing telephone stations.

FIG. 1 shows the Telemetry Interface Gateway (TIG) unit connected to a small local area network 25 controlled by a local area network controller 26. Local area network is connected to devices D1 (27), D2 (29), D3 (31), D4 (33), and D5 (35). These devices are interfaces to meters or to the controls of units such as air conditioning units, furnaces or other devices. If only a single meter is being telemetered by TIG 23 a more direct connection between the TIG and the device can be used.

Figure 2:
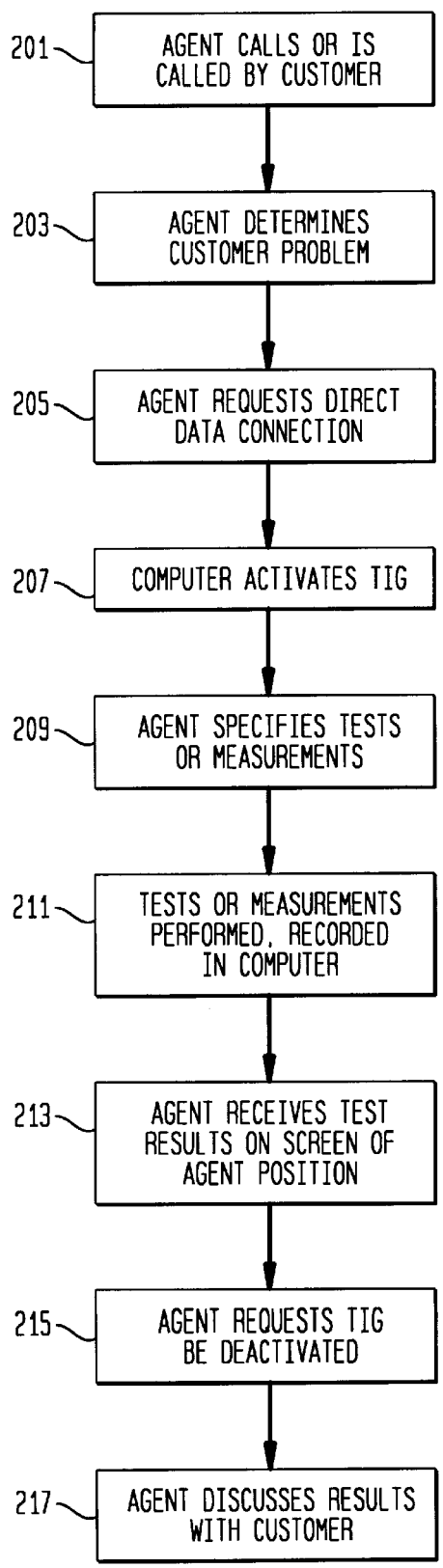

FIG. 2 is a flow diagram illustrating the operation of applicants' invention. A utility agent is called by a customer having a telemetering interface unit or the agent has reason to believe that there is a problem and calls the customer (Action Block 201). The agent discusses the problem with the customer in sufficient depth so that the agent can make a decision as to what types of tests and meter readings are to be performed (Action Block 203). The agent then requests a direct data connection to the customer's TIG (Action Block 205). This request is entered by the agent by typing an appropriate command on the keyboard of the agent position. Data entered on this keyboard is sent to the utility computer. The utility computer responds to this request by activating the customer's TIG (Action Block 207). The activation is performed by sending an alert signal after which, in conformance with present practice in the industry, a security dialogue takes place between the computer and the TIG. If the security dialogue successfully establishes that the correct unit is being accessed by a computer having the right to access that TIG, and the TIG accepts the accessing computer, then the TIG has been activated. The agent specifies the tests or measurements that are wanted by typing further commands into the agent position (Action Block 209). In response to these requests from the agent, the utility computer causes data signals to be transmitted to the TIG to request the tests or measurements, and the TIG responds with the results of these tests or measurements by sending data signals back. The data is transmitted using analog transmission, e.g., frequency shift keying. The returned data signals are recorded and interpreted by the computer and are then used to control a display of the test data at the utility agent position. The agent examines these results, which may include alternative actions suggested by the computer, and if necessary, possibly on the basis of alternatives suggested by the computer, specifies additional tests or measurements or actions at the utility computer (rebilling, etc.) (repeat of Action Blocks 209 and 211 which are then performed). The agent receives test results and any other data on a screen (Action Block 213). Eventually, the agent recognizes that no further tests or measurements are needed or are useful, and the agent requests that the TIG be deactivated (Action Block 215). The computer responds to this request by causing a deactivation signal to be sent to the TIG and the TIG, upon receiving that deactivation signal, re-establishes the normal connection between the customer telephone station and the agent position by removing any muting, turning off the telemetering lamp, and deactivating itself. Typically, the deactivation signal can be an 800 millisecond open loop signal to disconnect a modem carrier, or a deactivation message to the TIG. Subsequently, the agent discusses the results with the customer (Action Block 217) and, if the result of the tests and measurements indicate a real problem, will cause a maintenance craftsperson to be dispatched to the customer's premises.

FIG. 3 illustrates the sequence of steps for an arrangement wherein the agent receives information about the latest customer status prior to talking to the customer. When the customer dials a number (Action Block 301) associated with the service department or billing department of a service provider, if the customer has a TIG for accessing metering and/or control equipment associated with the service provider, then an initial connection is established between a control computer or equivalent system of the service provider and the TIG of the customer (Action Block 303). The service provider equipment then activates the TIG (Action Block 305) and communicates with the TIG (Action Block 307) in order to obtain measurements from metering equipment connected to the TIG. The results of these measurements are stored and are provided to the agent (Action Block 311) that is subsequently connected to the calling customer (Action Block 309). The agent can then talk to the customer (Action Block 313). The arrangements of FIG. 2 can subsequently be re-invoked in case the agent needs additional measurements not automatically taken at the time the call is initially established. All of this is done within a single call, which saves time and which insures that a single agent handles the entire transaction.

The same type of arrangement can be used for transmitting data between the utility control computer and the TIG during call tear-down, i.e., after the customer's telephone has been disconnected.

The above is one illustrative embodiment of applicants' invention. Many other embodiments will be apparent to those of ordinary skill in the art without departing from the scope of the invention. The invention is limited only by the attached claims.

What is claimed is:

1. A method of communicating between an agent of a service company and a customer wherein the customer has a Telemetering Interface Gateway (TIG) connected to the customer's telephone line comprising the steps of:

responsive to the customer's dialing a predetermined telephone number establishing a connection between the TIG of said customer and control equipment for one or more agent positions of said service company;

sending control signals to said TIG for controlling operations of said TIG;

sending response signals from said TIG for reporting responses to said control signals;

subsequently establishing a voice connection between said agent position and said customer telephone station.

2. The method of claim 1 further wherein the step of establishing a connection comprises the steps of:

receiving said pre-determined telephone number in a screening device;

alerting the TIG that a call is being made between the TIG and the control equipment; and controlling establishment of the connection between the TIG and said control equipment.

3. The method of claim 2 wherein the step of controlling establishment of said connection comprises the steps of activating said TIG.

4. The method of claim 3 wherein the step of establishing a connection comprises the step of transmitting a request to a switch for establishing said connection in response to a signal from said screening device.

5. The method of claim 2, wherein responsive to said alerting, said TIG sends signals to said control equipment for initiating a dialog between said control equipment and said TIG.

6. A TIG (Telemetering Interface Gateway) for communicating with an agent position comprising a control processor;

said control processor comprising memory and a central processing unit;

said memory for storing a program for controlling said control processor;

said control processor responsive to on-hook suppressed ringing voice band signals received from a control computer over a telephone line connected to said TIG for becoming activated for controlling customer premises equipment;

said control processor further being activated responsive to receipt of voice band signals received over said telephone line wherein said signals are sent while a subscriber telephone connected to said line is in an off-hook supervisory state;

said TIG being deactivated without sending a signal for disconnecting a call to said subscriber telephone.

7. Apparatus connected to the customer's telephone line for communicating with a service company, comprising:

means, responsive to the customer's dialing a predetermined telephone number for controlling establishment of a connection between a TIG (Telemetering Interface Gateway) of said customer and control equipment for one or more agent positions of said service company;

means for receiving control signals for controlling operations of said TIG;

means for sending response signals from said TIG for reporting responses to said control signals; and means for subsequently establishing a voice connection between said agent position and said customer telephone station.

8. The apparatus of claim 7, wherein the means for controlling establishment of a connection comprises:

means for receiving said pre-determined telephone number in a screening device;

means responsive to said screening device for alerting the TIG that a call is being made between the TIG and the control equipment.

9. The apparatus of claim 8, wherein TIG is responsive to said means for alerting for being activated.

10. The apparatus of claim 9, wherein the means for controlling establishment of a connection comprises means for transmitting a request to a switch for establishing said connection in response to a signal from said screening device.

11. The apparatus of claim 8, wherein responsive to said alerting, said TIG sends signals to said control equipment for initiating a dialog between said control equipment and said TIG.

* * * * *